United States Patent
Omori et al.

(10) Patent No.: US 10,506,177 B2
(45) Date of Patent: Dec. 10, 2019

(54) IMAGE PROCESSING DEVICE, IMAGE PROCESSING METHOD, IMAGE PROCESSING PROGRAM, IMAGE CAPTURE DEVICE, AND IMAGE DISPLAY DEVICE

(71) Applicant: Sharp Kabushiki Kaisha, Osaka-shi, Osaka (JP)

(72) Inventors: Keisuke Omori, Osaka (JP); Kei Tokui, Osaka (JP); Nao Shibuhisa, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 280 days.

(21) Appl. No.: 14/371,011

(22) PCT Filed: Jan. 9, 2013

(86) PCT No.: PCT/JP2013/050146
§ 371 (c)(1),
(2) Date: Jul. 8, 2014

(87) PCT Pub. No.: WO2013/105562
PCT Pub. Date: Jul. 18, 2013

(65) Prior Publication Data
US 2015/0009286 A1      Jan. 8, 2015

(30) Foreign Application Priority Data
Jan. 10, 2012   (JP) .................. 2012-001792

(51) Int. Cl.
*H04N 5/262*  (2006.01)
*H04N 13/139* (2018.01)

(52) U.S. Cl.
CPC ......... *H04N 5/2628* (2013.01); *H04N 13/139* (2018.05)

(58) Field of Classification Search
None
See application file for complete search history.

(56) References Cited

U.S. PATENT DOCUMENTS 6,950,469 B2 *  9/2005  Karczewicz .......... G06T 3/4007
                                                        375/240.17
2001/0046331 A1 * 11/2001 Altunbasak .......... H04N 1/3935
                                                        382/299

(Continued)

FOREIGN PATENT DOCUMENTS

WO    2011/033668 A1    3/2011

OTHER PUBLICATIONS

Official Communication issued in International Patent Application No. PCT/JP2013/050146, dated Feb. 12, 2013.

(Continued)

*Primary Examiner* — Kaitlin A Retallick
(74) *Attorney, Agent, or Firm* — Keating & Bennett, LLP

(57) ABSTRACT

There are provided an image processing device, image processing method, image processing program, image capture device, and image display device that prevent increase of computational complexity in image enlargement while mitigating degradation in image quality. An image input unit inputs a planar image signal containing signal values of pixels arranged on a plane and depth information including depth values corresponding to the pixels. An interpolation unit calculates a signal value for an interpolation coordinate between pixels on the plane by interpolating between the signal values of adjacent pixels which are present within a predetermined range from the interpolation coordinate. A weight decision unit determines a weighting factor for use in the interpolation based on the depth value of a reference pixel that is closest to the interpolation coordinate and the depth value of an adjacent pixel.

1 Claim, 13 Drawing Sheets

(56) References Cited

U.S. PATENT DOCUMENTS

| | | | |
|---|---|---|---|
| 2008/0267533 A1* | 10/2008 | Ida | G06T 3/403 |
| | | | 382/299 |
| 2011/0157229 A1* | 6/2011 | Ni | H04N 13/128 |
| | | | 345/646 |
| 2012/0147205 A1* | 6/2012 | Lelescu | G06T 3/4076 |
| | | | 348/218.1 |
| 2012/0162223 A1 | 6/2012 | Hirai et al. | |
| 2013/0022111 A1* | 1/2013 | Chen | H04N 19/597 |
| | | | 375/240.12 |
| 2013/0182780 A1* | 7/2013 | Alshin | H04N 19/117 |
| | | | 375/240.29 |
| 2014/0022555 A1* | 1/2014 | Ossig | G01S 7/51 |
| | | | 356/601 |
| 2014/0293018 A1* | 10/2014 | Pasquier | G06T 15/205 |
| | | | 348/51 |

OTHER PUBLICATIONS

Takagi et al., "6.3.2 Gazou Deta-no Naiso (image data interpolation) in Gazou Kaiseki Handobukku (Image Analysis Handbook)", University of Tokyo Press, Sep. 10, 2004, pp. 1360-1373.

\* cited by examiner

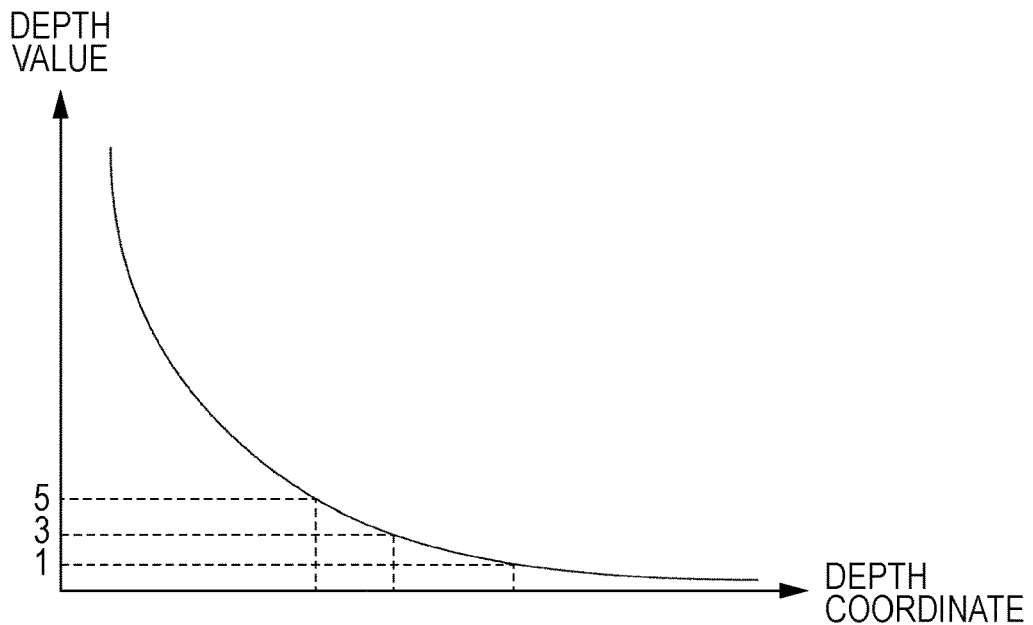

FIG. 11

| 200 | 200 | 200 | 175 | 125 | 100 | 100 | 100 | 100 | 100 |
|-----|-----|-----|-----|-----|-----|-----|-----|-----|-----|
| 200 | 200 | 200 | 175 | 125 | 100 | 100 | 100 | 100 | 100 |
| 200 | 200 | 200 | 175 | 125 | 100 | 100 | 100 | 100 | 100 |
| 200 | 200 | 200 | 175 | 125 | 100 | 100 | 100 | 100 | 100 |
| 200 | 200 | 200 | 175 | 125 | 100 | 100 | 100 | 100 | 100 |
| 200 | 200 | 200 | 175 | 125 | 100 | 100 | 100 | 100 | 100 |
| 200 | 200 | 200 | 175 | 125 | 100 | 100 | 100 | 100 | 100 |
| 200 | 200 | 200 | 175 | 125 | 100 | 100 | 100 | 100 | 100 |
| 200 | 200 | 200 | 175 | 125 | 100 | 100 | 100 | 100 | 100 |
| 200 | 200 | 200 | 175 | 125 | 100 | 100 | 100 | 100 | 100 |

|   |   |   |   |   |
|---|---|---|---|---|
| 0 | 0 | 0 | 0 | 0 |
| 0 | 0 | 0 | 0 | 10 |
| 0 | 0 | 0 | 10 | 10 |
| 0 | 0 | 10 | 10 | 10 |
| 0 | 10 | 10 | 10 | 10 |

I136 points to the × mark

| 0 | 0 | 0 | 0 | 0 | 0 | 0 | 0 | 0 | 1 |
|---|---|---|---|---|---|---|---|---|---|
| 0 | 0 | 0 | 0 | 0 | 0 | 0 | 0 | 1 | 4 |
| 0 | 0 | 0 | 0 | 0 | 0 | 0 | 1 | 5 | 8 |
| 0 | 0 | 0 | 0 | 0 | 0 | 1 | 4 | 8 | 10 |
| 0 | 0 | 0 | 0 | 0 | 1 | 5 | 8 | 9 | 10 |
| 0 | 0 | 0 | 0 | 1 | 4 | 8 | 10 | 10 | 10 |
| 0 | 0 | 0 | 1 | 5 | 8 | 9 | 10 | 10 | 10 |
| 0 | 0 | 1 | 4 | 8 | 10 | 10 | 10 | 10 | 10 |
| 0 | 1 | 4 | 8 | 10 | 10 | 10 | 10 | 10 | 10 |
| 1 | 5 | 8 | 9 | 10 | 10 | 10 | 10 | 10 | 10 |

I142, I136, I143, I144, I145

| I151 | | I142 | I143 | |
|---|---|---|---|---|
| 100 | 100 | 100 | 100 | 50 |
| 100 | 100 | 100 | 50 | 0 |
| 100 | 100 | 50 ✕ | 0 | 0 |
| 100 | 50 | 0 | 0 | 0 |
| 50 | 0 | 0 | 0 | 0 |

| 100 | 100 | 100 | 100 | 100 | 100 | 100 | 87 | 87 | 66 |
|-----|-----|-----|-----|-----|-----|-----|----|----|----|
| 100 | 100 | 100 | 100 | 100 | 87 | 87 | 66 | 66 | 16 |
| 100 | 100 | 100 | 100 | 100 | 87 | 87 | 66 | 33 | 0 |
| 100 | 100 | 100 | 87 | 87 | 66 | 66 | 16 | 0 | 0 |
| 100 | 100 | 100 | 87 | 87 | 66 | 33 | 0 | 0 | 0 |
| 100 | 87 | 87 | 66 | 66 | 16 | 0 | 0 | 0 | 0 |
| 100 | 87 | 87 | 66 | 33 | 0 | 0 | 0 | 0 | 0 |
| 87 | 66 | 66 | 16 | 0 | 0 | 0 | 0 | 0 | 0 |
| 87 | 66 | 33 | 0 | 0 | 0 | 0 | 0 | 0 | 0 |
| 66 | 16 | 0 | 0 | 0 | 0 | 0 | 0 | 0 | 0 |

| 100 | 100 | 100 | 100 | 100 | 100 | 100 | 100 | 50 | 50 |
|-----|-----|-----|-----|-----|-----|-----|-----|----|----|
| 100 | 100 | 100 | 100 | 100 | 100 | 100 | 100 | 50 | 50 |
| 100 | 100 | 100 | 100 | 100 | 100 | 50 | 50 | 0 | 0 |
| 100 | 100 | 100 | 100 | 100 | 100 | 50 | 50 | 0 | 0 |
| 100 | 100 | 100 | 100 | 50 | 50 | 0 | 0 | 0 | 0 |
| 100 | 100 | 100 | 100 | 50 | 50 | 0 | 0 | 0 | 0 |
| 100 | 100 | 50 | 50 | 0 | 0 | 0 | 0 | 0 | 0 |
| 100 | 100 | 50 | 50 | 0 | 0 | 0 | 0 | 0 | 0 |
| 50 | 50 | 0 | 0 | 0 | 0 | 0 | 0 | 0 | 0 |
| 50 | 50 | 0 | 0 | 0 | 0 | 0 | 0 | 0 | 0 |

I191

| 100 | 100 | 100 | 100 | 100 | 100 | 100 | 90 | 71 | 50 |
|-----|-----|-----|-----|-----|-----|-----|-----|-----|-----|
| 100 | 100 | 100 | 100 | 100 | 96  | 90  | 75  | 50  | 28  |
| 100 | 100 | 100 | 100 | 100 | 90  | 71  | 50  | 25  | 9   |
| 100 | 100 | 100 | 96  | 90  | 75  | 50  | 28  | 9   | 0   |
| 100 | 100 | 100 | 90  | 71  | 50  | 25  | 9   | 3   | 0   |
| 100 | 96  | 90  | 75  | 50  | 28  | 9   | 0   | 0   | 0   |
| 100 | 90  | 71  | 50  | 25  | 9   | 3   | 0   | 0   | 0   |
| 90  | 75  | 50  | 28  | 9   | 0   | 0   | 0   | 0   | 0   |
| 71  | 50  | 25  | 9   | 3   | 0   | 0   | 0   | 0   | 0   |
| 50  | 28  | 9   | 0   | 0   | 0   | 0   | 0   | 0   | 0   |

IMAGE PROCESSING DEVICE, IMAGE PROCESSING METHOD, IMAGE PROCESSING PROGRAM, IMAGE CAPTURE DEVICE, AND IMAGE DISPLAY DEVICE

TECHNICAL FIELD

The present invention relates to an image processing device, image processing method, image processing program, image capture device, and image display device.

BACKGROUND ART

There have been proposals of digital image enlargement for displaying one image on media of different display sizes or resolutions. Image enlargement is carried out by increasing the interval between pixels contained in an original image (hereinafter called "original pixels") and generating new pixels between original pixels. A signal value for a new pixel can be determined by interpolation of signal values associated with original pixels surrounding the new pixel. This enables the same image as the original image to be displayed on a display media having a larger display size or a higher resolution. As image display devices with high resolution (video display devices like computers or televisions) have become popular in these years, image enlargement for display media is increasingly important.

As examples of image enlargement techniques, NPL 1 describes nearest neighbor interpolation (also known as nearest neighbor method), bi-linear interpolation (also known as bi-linear method or linear interpolation), and bi-cubic interpolation (also known as cubic convolution interpolation).

Nearest neighbor interpolation is a process in which the signal value of the original pixel closest to a pixel to be newly generated (hereinafter, referred to as "interpolated pixel") is adopted as the signal value for the interpolated pixel.

Bi-linear interpolation is a process in which a weighted mean of signal values of four original pixels surrounding an interpolated pixel is determined as the signal value for the interpolated pixel.

Bi-cubic interpolation is a process in which the signal value for an interpolated pixel is determined using a cubic equation adapted to the signal values of 16 original pixels that surround the interpolated pixel.

CITATION LIST

Non Patent Literature

NPL 1: Mikio Takagi and Haruhisa Shimoda (ed.), 6.3.2 Gazou Deta-no Naiso (image data interpolation) in "Gazou Kaiseki Handobukku (Image Analysis Handbook)", University of Tokyo Press, Sep. 10, 2004, pp. 1360-1373

SUMMARY OF INVENTION

Technical Problem

In the nearest neighbor interpolation, however, a positional error corresponding to the pixel pitch (inter-pixel interval) of the original image occurs, possibly causing degradation in image quality. For example, if the direction of a boundary (edge) at which signal values sharply change in the original image is oblique rather than being horizontal or vertical, an image can be generated in which the edge looks like stair steps, which is called aliasing or jaggies.

In bi-linear interpolation, due to gradual variation of signal values between pixels, image quality can be degraded. For instance, an image with an unclear edge (or a blur) could be generated.

Bi-cubic interpolation can generate an image with less degradation than the nearest neighbor interpolation or bi-linear interpolation. Bi-cubic interpolation however has the problem of high computational complexity because a wide range of original pixels is referenced for calculating the signal value for a single interpolated pixel.

The present invention has been made in view of the foregoing, and provides an image processing device, image processing method, image processing program, image capture device, and image display device that both prevent increase of computational complexity in image enlargement and mitigate degradation in image quality.

Solution to Problem (1) The present invention has been made in order to solve the challenges outlined above, and a first technical aspect of the invention is an image processing device including: an image input unit that inputs a planar image signal containing signal values of pixels arranged on a plane and depth information including depth values corresponding to the pixels; an interpolation unit that calculates a signal value for an interpolation coordinate between pixels on the plane by interpolating between the signal values of adjacent pixels which are present within a predetermined range from the interpolation coordinate; and a weight decision unit that determines a weighting factor for use in the interpolation based on the depth value of a reference pixel that is closest to the interpolation coordinate and the depth value of an adjacent pixel.

(2) A second technical aspect of the invention is the image processing device according to the first technical aspect, wherein the weight decision unit determines the weighting factor based on the difference between a distance in depth direction represented by the depth value of the reference pixel and the distance in depth direction represented by the depth value of the adjacent pixel.

(3) A third technical aspect of the invention is the image processing device according to the first technical aspect, wherein the weight decision unit determines the weighting factor based on the difference in the distance between a three-dimensional position represented by a position of the reference pixel on a planar image and its depth value and a three-dimensional position represented by the position of the adjacent pixel on the planar image and its depth value.

(4) A fourth technical aspect of the invention is the image processing device according to the second technical aspect, wherein the weight decision unit determines the weighting factor based on the distance on the plane from the reference pixel to the interpolation coordinate.

(5) A fifth technical aspect of the invention is the image processing device according to the first technical aspect, further including a depth information interpolation unit that calculates the depth value for the interpolation coordinate by interpolating between the depth values of the adjacent pixels, wherein the weight decision unit determines a weighting factor for use in the interpolation based on the difference between the depth value of the interpolation coordinate and the depth value of an adjacent pixel.

(6) A sixth technical aspect of the invention is the image processing device according to the fifth technical aspect, wherein the weight decision unit determines a weighting factor for use in the interpolation based on the difference between the depth value of the interpolation coordinate and the depth value of another interpolation coordinate contained in a region of an adjacent pixel.

(7) A seventh technical aspect of the invention is an image processing method to be performed in an image processing device, the method including the steps of: inputting, by the image processing device, a planar image signal containing signal values of pixels arranged on a plane and depth information including depth values corresponding to the pixels; calculating a signal value for an interpolation coordinate between pixels on the plane by interpolating between the signal values of adjacent pixels which are present within a predetermined range from the interpolation coordinate; and determining a weighting factor for use in the interpolation based on the depth value of a reference pixel that is closest to the interpolation coordinate and the depth value of an adjacent pixel.

(8) An eighth technical aspect of the invention is an image processing program for causing a computer in an image processing device to execute the processes of: inputting a planar image signal containing signal values of pixels arranged on a plane and depth information including depth values corresponding to the pixels; calculating a signal value for an interpolation coordinate between pixels on the plane by interpolating between the signal values of adjacent pixels which are present within a predetermined range from the interpolation coordinate; and determining a weighting factor for use in the interpolation based on the depth value of a reference pixel that is closest to the interpolation coordinate and the depth value of an adjacent pixel.

(9) A ninth technical aspect of the invention is an image capture device including: a plurality of image capture units that capture images from viewpoints different from each other; a depth information generating unit that generates depth information including depth values corresponding to pixels which are contained in images captured by the plurality of image capture units and are arranged on a plane, based on signal values of the pixels; an interpolation unit that calculates the signal value for an interpolation coordinate between pixels on the plane by interpolating between the signal values of adjacent pixels which are present within a predetermined range from the interpolation coordinate; and a weight decision unit that determines a weighting factor for use in the interpolation based on the depth value of a reference pixel that is closest to the interpolation coordinate and the depth value of an adjacent pixel.

(10) A tenth technical aspect of the invention is an image display device including: an image input unit that inputs a planar image signal containing signal values of pixels arranged on a plane and depth information including depth values corresponding to the pixels; an interpolation unit that calculates the signal value for an interpolation coordinate between pixels on the plane by interpolating between the signal values of adjacent pixels which are present within a predetermined range from the interpolation coordinate; a weight decision unit that determines a weighting factor for use in the interpolation based on the depth value of a reference pixel that is closest to the interpolation coordinate and the depth value of an adjacent pixel; and a display unit that displays an image represented by an interpolated planar image signal containing the signal value of the interpolation coordinate.

Advantageous Effects of Invention

The present invention prevents increase of computational complexity in image enlargement while mitigating degradation in image quality.

BRIEF DESCRIPTION OF DRAWINGS

FIG. 9 conceptually illustrates an example of the relation between depth value and depth coordinates.
FIG. 10 shows an example of an interpolated image block.
FIG. 11 shows another example of an interpolated image block.
FIG. 13 shows another example of a depth block.
FIG. 14 shows an example of an interpolated depth block.
FIG. 17 shows another example of an interpolated image block.
FIG. 18 shows another example of an interpolated image block.

DESCRIPTION OF EMBODIMENTS (First Embodiment)

A first embodiment of the present invention will be described below with reference to drawings.

Figure 1:
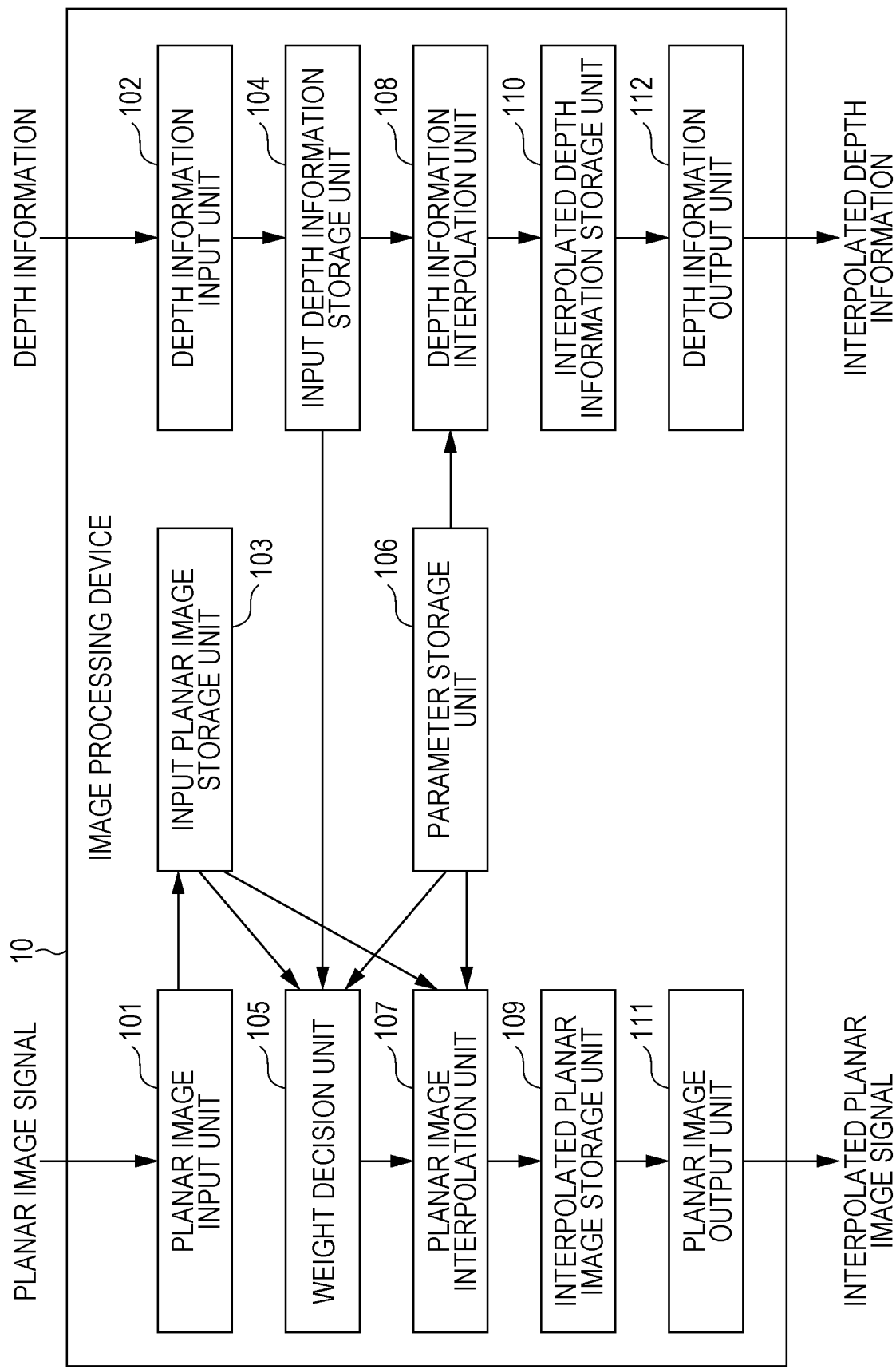
FIG. 1 schematically illustrates the configuration of an image processing device according to a first embodiment of the present invention.

FIG. 1 schematically illustrates the configuration of an image processing device 10 according to the first embodiment.

The image processing device 10 includes a planar image input unit 101, a depth information input unit 102, an input planar image storage unit 103, an input depth information storage unit 104, a weight decision unit 105, a parameter storage unit 106, a planar image interpolation unit 107, a depth information interpolation unit 108, an interpolated planar image storage unit 109, an interpolated depth information storage unit 110, a planar image output unit 111, and a depth information output unit 112.

To the planar image input unit 101, a planar image signal is input for each frame from outside the image processing device 10. A planar image signal is an image signal containing signal values that represent the color and/or shading of subjects contained in the object space and correspond to pixels arranged on a two-dimensional plane. A planar image signal is an image signal having signal values representing a color space for each pixel, e.g., an RGB signal. An RGB signal contains as signal values an R signal representing a red component value, G signal representing a green component value, and B signal representing a blue component value.

The planar image input unit 101 stores the input planar image signal in the input planar image storage unit 103.

Figure 2:
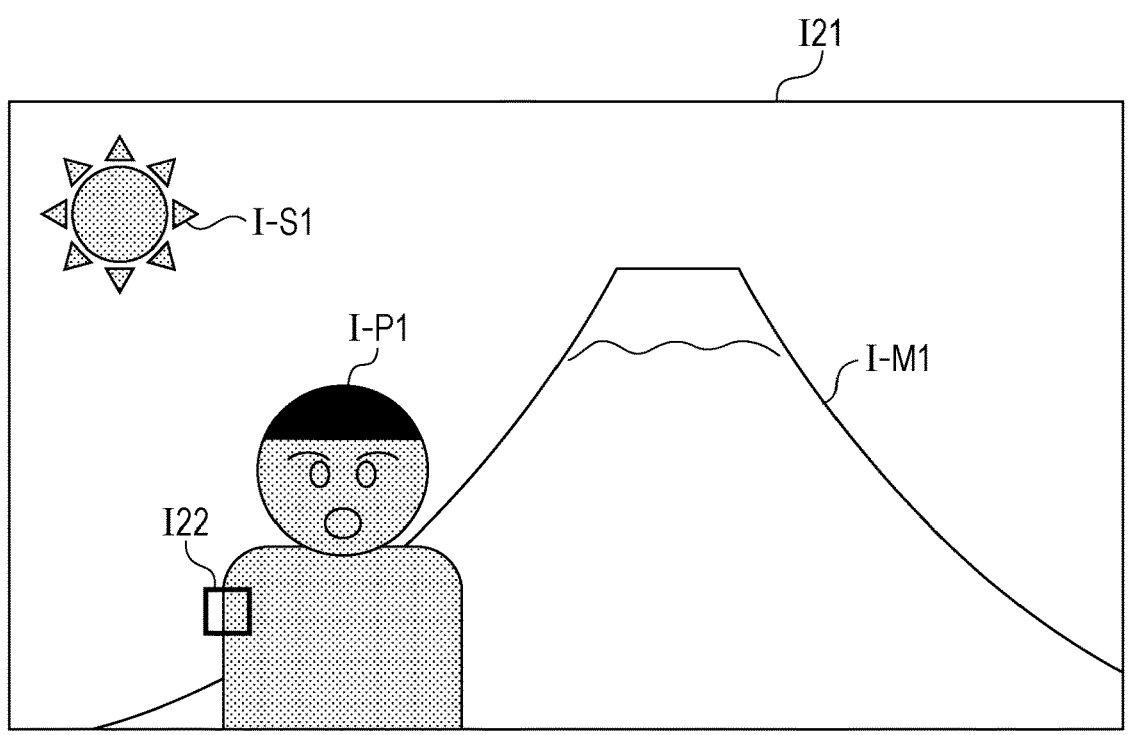
FIG. 2 shows an example of a planar image.

FIG. 2 shows an example of a planar image.

A planar image I21 is an image showing the sun I-S1, a mountain I-M1, and a person I-P1 as subjects. The square region indicated on the left side of the person I-P1 is an image block I22. The image block I22 is an image representing a portion of the planar image I21 and composed of multiple pixels.

Referring back to FIG. 1, to the depth information input unit 102, depth information is input for each frame from outside the image processing device 10. Depth information is information including a depth value (also called just "depth") representing the distance from the viewpoint (the position at which the imaging device is placed) to the surface of a subject contained in the object space. A depth value corresponds to each one of multiple pixels arranged on a two-dimensional plane in a planar image and also corresponds to a signal value contained in a planar image signal. Aside from distance itself, the depth value may also be a variable representing distance, e.g., a disparity value. Depth information may be a depth map (sometimes called a depth image), for example.

The depth information input unit 102 stores the input depth information in the input depth information storage unit 104.

A depth image is an image representing brightness corresponding to the depth value of each pixel. The exemplary depth image given below shows that the brightness increases as the distance from the viewpoint decreases.

Figure 3:
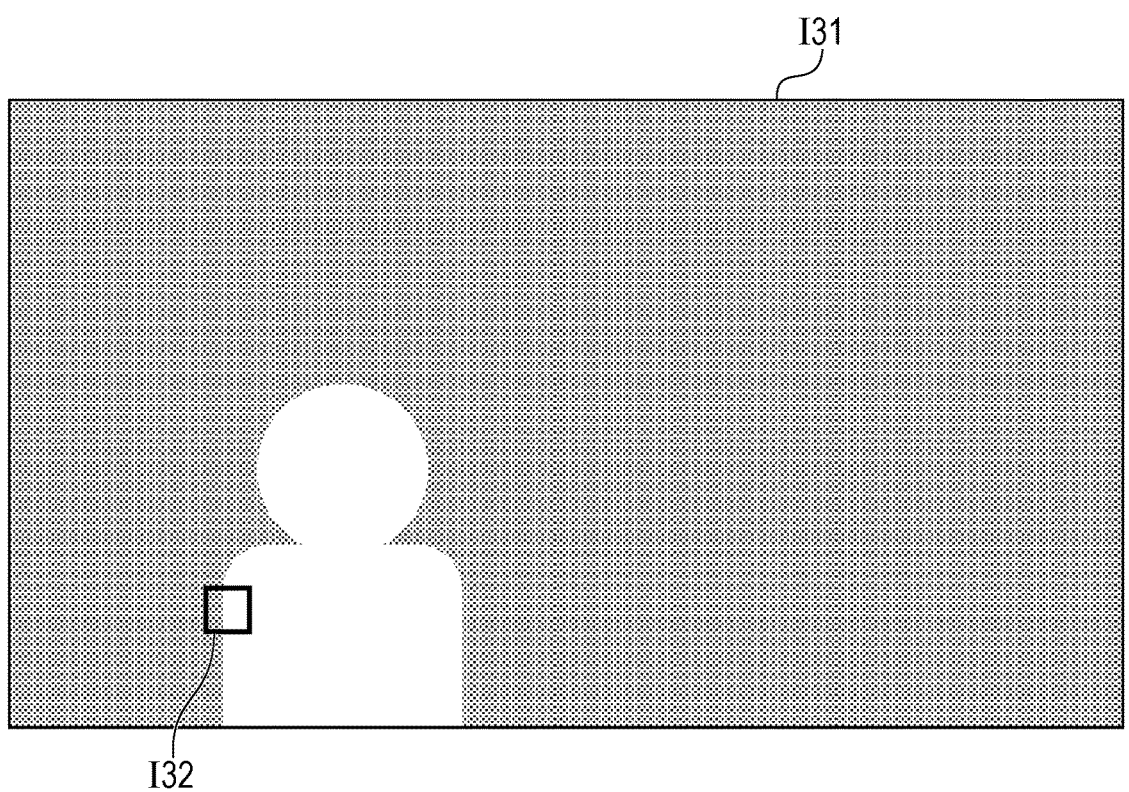
FIG. 3 shows an example of a depth image.

FIG. 3 shows an exemplary depth image I31.

The depth image I31 is an image representing the distance to a subject shown by the planar image I21. In the depth image I31, the region representing the person I-P2 is indicated in a lighter color than the other region. The depth image I31 thus means that the person I-P2 is at a shorter distance from the viewpoint than the other subjects.

The square region shown on the left side of the person I-P2 is a depth block I32. The depth block I32 occupies the same region as the region occupied by the image block I22 of FIG. 2.

Referring back to FIG. 1, the weight decision unit 105 reads a planar image signal from the input planar image storage unit 103 and depth information from the input depth information storage unit 104. The weight decision unit 105 reads parameters from the parameter storage unit 106 for use in interpolation as described later (hereinafter called as "interpolation parameters").

The weight decision unit 105 uses the read interpolation parameters to determine a weighting factor to be used in interpolation of signal values contained in the read planar image signal. Here, the weight decision unit 105 determines the weighting factor based on depth values corresponding to the pixels positioned within a predefined range from an interpolated pixel (hereinafter "adjacent pixels") and the distance between the interpolated pixel and each of the adjacent pixels. An interpolated pixel is a pixel that is newly generated between pixels. The process to determine the weighting factor will be described later.

The weight decision unit 105 outputs the weighting factor determined to the planar image interpolation unit 107.

The parameter storage unit 106 prestores interpolation parameters. Interpolation parameters may include interpolation factor, interpolation coordinates, and frame size (the numbers of pixels in the horizontal and vertical directions contained in a planar image signal or depth information for one frame), for example. The interpolation factor is a ratio of the size of a planar image signal for a certain display region after interpolation (an interpolated planar image signal) to the size of the planar image signal that was input (input planar image signal) for that display region. The term "size" herein refers to the number of pixels (width) in the horizontal direction or the number of pixels (width) in the vertical direction of the display region. In other words, the interpolation factor represents the radio of the resolution of the interpolated planar image to the resolution of the input planar image. An interpolation coordinate is coordinates that represent the position of the center point of the region occupied by an interpolated pixel.

The planar image interpolation unit 107 reads a planar image signal from the input planar image storage unit 103 and interpolation parameters from the parameter storage unit 106. The planar image interpolation unit 107 also reads weighting factors from the weight decision unit 105.

The planar image interpolation unit 107 inputs the signal value of each adjacent pixel contained in the read planar image signal and performs interpolation using the weighting factors to calculate a signal value for the interpolation coordinate. The processes to calculate the signal value for the interpolation coordinate will be described later.

The planar image interpolation unit 107 stores the signal value calculated in the interpolated planar image storage unit 109 in association with the interpolation coordinate. Thus, in the interpolated planar image storage unit 109, interpolated planar image signals including signal values each corresponding to an interpolation coordinate are stored.

The depth information interpolation unit 108 reads depth information from the input depth information storage unit 104 and interpolation parameters from the parameter storage unit 106.

The depth information interpolation unit 108 uses the read interpolation parameters to interpolate between the depth values of the adjacent pixels contained in the read depth information, thereby calculating the depth value for the interpolation coordinate.

The depth information interpolation unit 108 may employ methods like nearest neighbor interpolation, bi-linear interpolation, and bi-cubic interpolation, for example, for interpolation.

The depth information interpolation unit 108 stores the calculated depth value in the interpolated depth information storage unit 110 in association with the interpolation coordinate. Thus, in the interpolated depth information storage unit 110, interpolated depth information including depth values each corresponding to an interpolation coordinate is stored.

The planar image output unit 111 reads an interpolated planar image signal from the interpolated planar image storage unit 109 and outputs it to outside the image processing device 10 for each frame.

The depth information output unit 112 reads interpolated depth information from the interpolated depth information storage unit 110 and outputs it outside the image processing device 10 for each frame.

Image processing performed by the image processing device 10 is described next.

Figure 4:
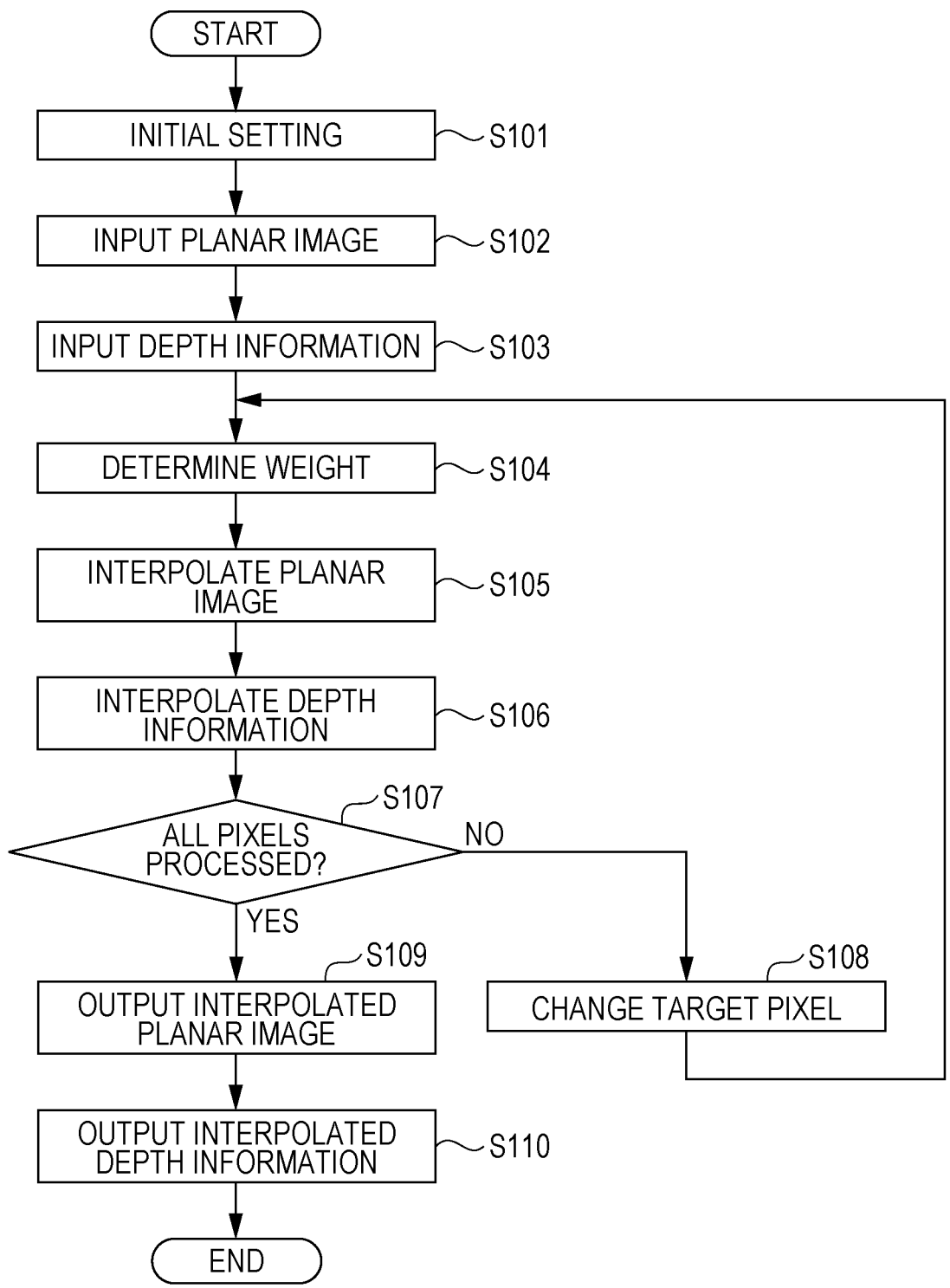
FIG. 4 is a flowchart illustrating image processing according to the first embodiment.

FIG. 4 is a flowchart illustrating image processing performed in this embodiment.

(Step S101) The image processing device 10 initially establishes factors and the like required for processing. In this step, the weight decision unit 105, the planar image interpolation unit 107, and the depth information interpolation unit 108 read interpolation parameters from the parameter storage unit 106. The image processing device 10 defines the initial interpolation coordinate in each frame as the interpolation coordinate present at coordinates closest to the origin of that frame, for example. The origin of a frame is the uppermost and leftmost coordinates of the frame. The process then proceeds to step S102.

(Step S102) To the planar image input unit 101, a planar image signal is input per frame from outside the image processing device 10. The planar image input unit 101 stores the input planar image signal in the input planar image storage unit 103. The process then proceeds to step S103.

(Step S103) To the depth information input unit 102, depth information is input for each frame from outside the image processing device 10. The depth information input unit 102 stores the input depth information in the input depth information storage unit 104. The process then proceeds to step S104.

(Step S104) The weight decision unit 105 reads a planar image signal from the input planar image storage unit 103 and depth information from the input depth information storage unit 104.

The weight decision unit 105 uses the interpolation parameters to determine weighting factors for interpolation of the signal values contained in the read planar image signal. The weight decision unit 105 outputs the weighting factors determined to the planar image interpolation unit 107. The process then proceeds to step S105.

(Step S105) The planar image interpolation unit 107 reads the planar image signal from the input planar image storage unit 103. To the planar image interpolation unit 107, the weighting factors are input from the weight decision unit 105.

The planar image interpolation unit 107 interpolates between the signal values of the adjacent pixels contained in the read planar image signal using the input weighting factors to calculate the signal value at the interpolation coordinate. The planar image interpolation unit 107 stores the signal value calculated in the interpolated planar image storage unit 109 in association with the interpolation coordinate. The process then proceeds to step S106.

(Step S106) The depth information interpolation unit 108 reads depth information from the input depth information storage unit 104.

The depth information interpolation unit 108 interpolates between the depth values of the adjacent pixels contained in the read depth information using the interpolation parameters to calculate the depth value at the interpolation coordinate.

The depth information interpolation unit 108 stores the depth value calculated in the interpolated depth information storage unit 110 in association with the interpolation coordinate. The process then proceeds to step S107.

(Step S107) The image processing device 10 determines whether or not processing is completed for all of the interpolation coordinates contained in each frame. If it is determined that processing is completed (step S107: Y), the process then proceeds to step S109. If it is determined that processing is not completed yet (step S107: N), the process then proceeds to step S108.

(Step S108) The image processing device 10 changes the interpolation coordinate for which processing is performed. The image processing device 10 may change the interpolation coordinate in the order of rasterization, for example. In the order of rasterization, the current interpolation coordinate successively changes from the coordinates in the leftmost column to the right-hand neighbor in each row, and after reaching the rightmost column, moves on to the leftmost column in the next row. The process then proceeds to step S104.

(Step S109) The planar image output unit 111 reads an interpolated planar image signal from the interpolated planar image storage unit 109 and outputs it to outside the image processing device 10 for each frame. The process then proceeds to step S110.

(Step S110) The depth information output unit 112 reads interpolated depth information from the interpolated depth information storage unit 110 and outputs it to outside the image processing device 10 for each frame. The process then ends.

Next an example of adjacent pixels and interpolation coordinates is described.

An adjacent pixel is a pixel to be considered in interpolation among the pixels contained in an input image signal. Of such adjacent pixels, a pixel occupying an area containing the interpolation coordinate is called a reference pixel in particular.

Interpolation coordinate $p_{i(xy)}$ on a plane (an x-y plane) may be represented by expression (1), for example.

[Math 1]

$$p_{i(xy)} = \left(i_x + \frac{k}{N} + \frac{1}{2}, i_y + \frac{l}{N} + \frac{1}{2}\right) \quad (1)$$

In expression (1), $i_x$ is the index of the reference pixel for the horizontal direction (x-direction). k is the index of the interpolation coordinate for the horizontal direction. k is independently determined for each reference pixel and is 0 at a point representing another reference pixel that neighbors the reference pixel in the horizontal direction. k is an integer equal to or greater than −N and smaller than N. N is an integer value representing a predefined interpolation factor, that is, the number of interpolated pixels between reference pixels. $i_Y$ is the index of the reference pixel for the vertical direction (y-direction). l is the index of the interpolation coordinate for the vertical direction. l is determined independently for each reference pixel and is 0 at a point representing another reference pixel that neighbors the reference pixel in the vertical direction. l is an integer equal to or greater than −N and smaller than N. In expression (1), the interpolation coordinate $p_{i(xy)}$ is normalized so that the inter-pixel distance (pixel pitch) between reference pixels is 1.

Figure 5:
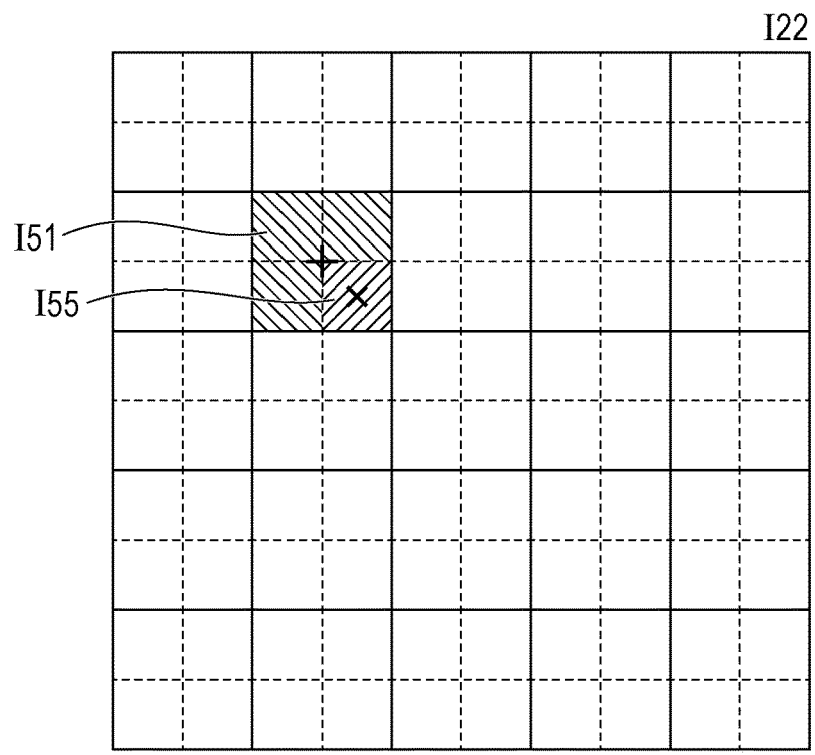
FIG. 5 shows an example of an image block.

An example of the interpolation coordinate and corresponding reference pixel is illustrated in FIG. 5.

FIG. 5 shows an exemplary image block I22.

FIG. 5 represents an image block I22 (see FIG. 2). In the image block I22, squares with their four sides all represented by solid lines represent regions occupied by pixels corresponding to the individual signal values contained in the input image signal. Herein, these pixels are specifically called original pixels. The image block I22 contains 25 (five in the horizontal direction×five in the vertical direction) original pixels. A square with some of its four sides indicated by solid line and the remaining sides by broken lines represents an interpolated pixel. An interpolated pixel is a pixel defined with the interpolation coordinate as its center coordinates. In FIG. 5, one original pixel contains four (two in the horizontal direction×two in the vertical direction) interpolated pixels.

For example, in FIG. 5, the region hatched with lines oriented from lower left to upper right represents an interpolated pixel I55. The symbol "×" indicated at the center of the interpolated pixel I55 is the interpolation coordinate of the interpolated pixel I55. The interpolated pixel I55 plus the area hatched with lines from upper left to lower right represents a reference pixel I51. The symbol "+" indicated at the center of the reference pixel I51 represents the center coordinates of the reference pixel I51.

Figure 6:
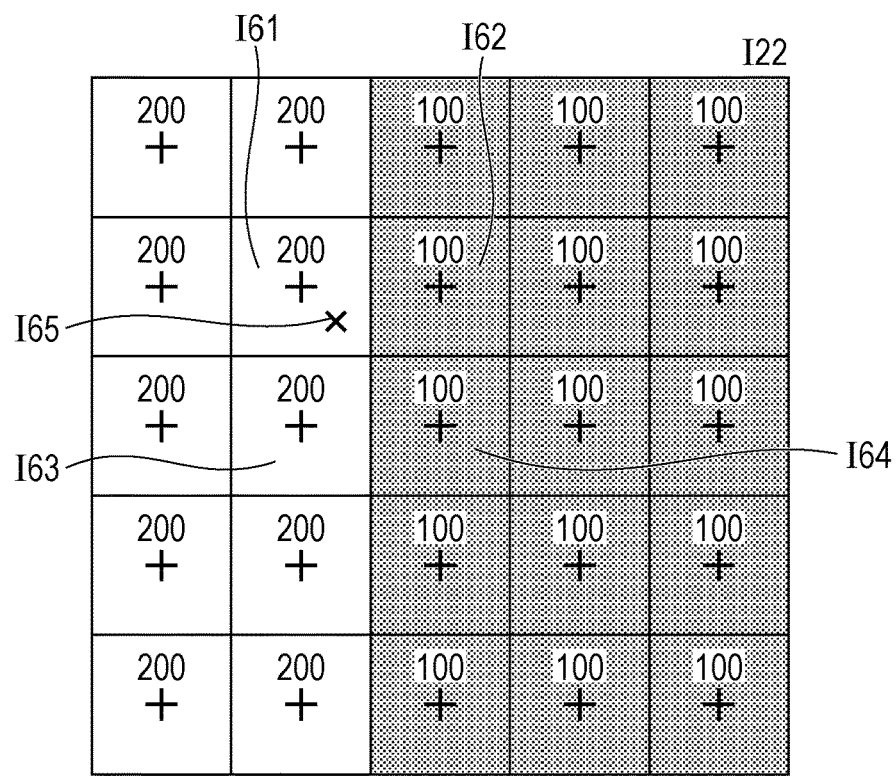
FIG. 6 shows another example of an image block.

Next, referring to FIG. 6, there is shown an example of an interpolation coordinate and corresponding adjacent pixels.

FIG. 6 shows an exemplary image block I22.

FIG. 6 shows an image block I22 (see FIG. 2). The 25 squares (five in the horizontal direction×five in the vertical direction) contained in the image block I22 each represent the area occupied by an original pixel. A figure such as 200 or 100 included in each square indicates the signal value (e.g., R-signal value) corresponding to that pixel. The squares are indicated in a lighter color as they have a greater signal value. The symbol "+" indicated in each square represents the center coordinates.

The symbol "×" contained in pixel I61 positioned in the second row from the top in the second column from the left represents an interpolation coordinate I65. That is, the pixel I61 is a reference pixel and one of adjacent pixels. The neighboring pixel on the right of the reference pixel I61 is an adjacent pixel I62. The neighboring pixel below the reference pixel I61 is an adjacent pixel I63. The neighboring pixel at the lower right of the reference pixel I61 is an adjacent pixel I64. This shows that original pixels whose center is positioned at a shorter distance from the interpolation coordinate I65 than a predetermined distance are defined as adjacent pixels I61 to I64. In the example of FIG. 6, an adjacent pixel is defined as such an original pixel for which the maximums of the horizontal and vertical distances from the interpolation coordinate I65 to its center are smaller than the pixel pitch of the original image.

Figure 7:
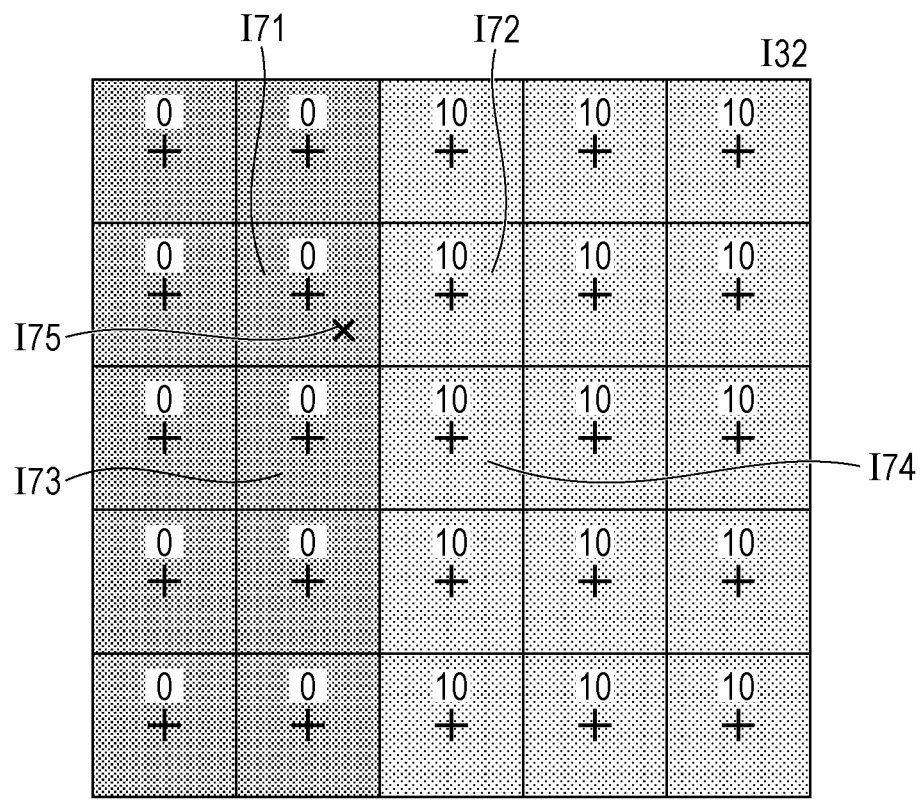
FIG. 7 is an enlarged view of an exemplary depth block.

An example of interpolation coordinates and associated adjacent pixels in depth information corresponding to the above-described planar image is shown in FIG. 7.

FIG. 7 shows an exemplary depth block I32.

FIG. 7 shows a depth block I32 (see FIG. 3). A depth block is information with a depth value given to each one of the pixels contained in a partial region of a depth image. The 25 squares (five in the horizontal direction×five in the vertical direction) contained in the depth block I32 each represent the area occupied by an original pixel in depth information. A figure such as 0 included in each square represents the depth value corresponding to that pixel. The squares are indicated in a lighter color as they have a greater depth value. The symbol "+" indicated in each square represents the center coordinates.

An interpolation coordinate I75 represents coordinates in depth information at the same position as the interpolation coordinate I65 (see FIG. 6). Adjacent pixels I71 to I74 represent the same pixels as the adjacent pixels I61 to I64.

Next, the process for the weight decision unit 105 to determine a weighting factor is described.

The weight decision unit 105 defines an adjacent pixel as a pixel whose center point is positioned at a shorter distance from the interpolation coordinate than a predetermined distance (threshold). The weight decision unit 105 determines the weighting factor $w_j$ for each adjacent pixel j based on the depth value $p_{j(z)}$ corresponding to the adjacent pixel j and the depth value $p_{i(z)}$ corresponding to the reference pixel i. The distance threshold and the number of adjacent pixels are included in interpolation parameters.

The weight decision unit 105 may use any of the methods described below to determine the weighting factor $w_j$, for example, though the present invention is not limited thereto.

<First Weight Decision Scheme>

In a case where the absolute value $\Delta p_{j(z)}$ of the difference between the depth value $p_{j(z)}$ corresponding to the adjacent pixel j and the depth value $p_{i(z)}$ corresponding to the reference pixel i is greater than a predetermined threshold (which may be 1 for example), the weight decision unit 105 sets the weighting factor $w_j$ to 0. The suffix (z) means that it concerns a depth value representing the distance from the viewpoint (a coordinate value in z-direction). The difference absolute value $\Delta p_{j(z)}$ is represented as $|p_{j(z)}-p_{i(z)}|$. When the difference absolute value $\Delta p_{j(z)}$ is smaller than or equal to the threshold, the weight decision unit 105 sets the weighting factor $w_j$ to 1. In this weight decision scheme, the threshold for depth value difference is included in interpolation parameters. In the example shown in FIG. 7, weighting factors for the reference pixel I71, and adjacent pixels I72, I73, and I74 are determined as 1, 0, 1, and 0, respectively. This means that greater importance is given to an adjacent pixel j that has a smaller difference in depth value from the reference pixel i. In contrast, an adjacent pixel j having a large difference in depth value from the reference pixel i is ignored.

<Second Weight Decision Scheme>

The weight decision unit 105 determines the weighting factor $w_j$ for each adjacent pixel j such that the weighting factor $w_j$ is successively smaller for a greater absolute value $\Delta p_{j(z)}$ of the difference between the depth value $p_{j(z)}$ corresponding to the adjacent pixel j and the depth value $p_{i(z)}$ corresponding to the reference pixel i. The weight decision unit 105 uses expression (2) for determining the weighting factor $w_j$, for example.

[Math 2]

$$w_j = 1 - \frac{\Delta p_{j(z)}}{\Delta p_{(z)max}} \quad (2)$$

In expression (2), $\Delta p_{(z)max}$ is the maximum value of the difference absolute value $\Delta p_{j(z)}$ for the interpolated pixel of interest. Thus, according to expression (2), the weighting factor $w_j$ is 0 for an adjacent pixel j for which the difference is the maximum $\Delta p_{(z)max}$ and the weighting factor $w_j$ is 1 for the reference pixel.

<Third Weight Decision Scheme>

The weight decision unit 105 determines the weighting factor $w_j$ by further performing calculation on a weighting factor determined based on depth values by the second weight decision scheme in consideration of the distance $\Delta p_{j(xy)}$ on a plane between the interpolation coordinate $p_{i(xy)}$ and an adjacent pixel $(j_x, j_y)$. The suffix (xy) means that it concerns the distance between pixels on a plane defined by the horizontal direction (x-direction) and the vertical direction (y-direction). The weight decision unit 105 uses expression (3), for example, for determining weighting factor $w_j$.

[Math 3]

$$w_j = \left(1 - \frac{\Delta p_{j(xy)}}{\Delta p_{(xy)max}}\right)\left(1 - \frac{\Delta p_{j(z)}}{\Delta p_{(z)max}}\right) \quad (3)$$

In expression (3), $\Delta p_{(xy)max}$ is the maximum of distance $\Delta p_{j(xy)}$ on a plane. Thus, according to expression (3), the weighting factor $w_j$ is 0 for an adjacent pixel j for which the distance is the maximum $\Delta p_{(xy)max}$ and the weighting factor $w_j$ is the maximum for the reference pixel i. The weighting factor $w_j$ is thus determined so as to further become linearly smaller as the distance $\Delta p_{j(xy)}$ increases.

<Fourth Weight Decision Scheme>

The weight decision unit 105 determines the weighting factor $w_j$ based on the distance $\Delta d_{j(z)}$ between the depth coordinates $Z_j$ of the depth value $p_{j(z)}$ corresponding to adjacent pixel j in a three-dimensional space and the depth coordinates $Z_i$ of the depth value $p_{i(z)}$ corresponding to the reference pixel i in a three-dimensional space.

Here, the weight decision unit 105 converts the center coordinates j of the adjacent pixel to the depth coordinate $Z_j$ using, for example, expression (4), with reference to depth values included in depth information.

[Math 4]

$$Z_j = \frac{Bqf}{p_{j(z)}} \quad (4)$$

In expression (4), the depth coordinate $Z_j$ is coordinates defined with the direction of the optical axis representing the depth direction when the position at which the imaging device is placed is the origin. B represents the length of the baseline, i.e., the distance between two imaging devices. q represents the pixel pitch of image pickup elements of the imaging devices. f represents the focal distance of the imaging devices. That is, the coordinate value $Z_j$ in depth direction determined with expression (4) is the product of the focal distance and the baseline length divided by a depth value.

The weight decision unit 105 uses expression (5), for example, for determining the weighting factor $w_j$.

[Math 5]

$$w_j = 1 - \frac{\Delta d_{j(z)}}{\Delta d_{(z)max}} \quad (5)$$

In expression (5), $\Delta d_{(z)max}$ is the maximum of distance $\Delta d_{j(z)}$. Thus, according to expression (5), the weighting factor $w_j$ is 0 for an adjacent pixel j which is positioned at the distance of the maximum $\Delta d_{(z)max}$ and the weighting factor $w_j$ is 1 for the reference pixel. In this weight decision scheme, pixel pitch q, focal distance f, and baseline length B are included in interpolation parameters.

The weighting factor $w_j$ may also be determined with further multiplication by $(1-\Delta p_{j(xy)}/\Delta p_{(xy)max})$ in consideration of a planar distance $\Delta p_{j(xy)}$ as in the third weight decision scheme.

<Fifth Weight Decision Scheme>

The weight decision unit 105 determines the weighting factor $w_j$ in consideration of the distance $\Delta d_{j(xyz)}$ between the three-dimensional position $p_{j(xyz)}$ corresponding to the center coordinates of the reference pixel i and the three-dimensional position $p_{i(xyz)}$ corresponding to the center coordinates of adjacent pixel j. The suffix (xyz) means that it concerns three-dimensional coordinates.

Here, the weight decision unit 105 converts the center coordinates j of the adjacent pixel to a three-dimensional position $p_{i(xyz)}$ using expression (6), for example, with reference to depth values included in depth information.

[Math 6]

$$X_j = \frac{Bq}{p_{j(z)}} j_x, \quad Y_j = \frac{Bq}{p_{j(z)}} j_y, \quad Z_j = \frac{Bqf}{p_{j(z)}} \quad (6)$$

In expression (6), $(X_j, Y_j, Z_j)$ represents a three-dimensional position $p_{j(xyz)}$ in the object space referenced to the position at which the imaging device is located (the focus of the optical system, namely the viewpoint). $X_j$, $Y_j$, and $Z_j$ respectively represent coordinate values in the horizontal, vertical, and depth directions. Thus, coordinate values for horizontal and vertical directions determined by expression (6) are each the product of the pixel coordinate value at the imaging device and the baseline length divided by the pixel's depth value.

The weight decision unit 105 uses expression (7), for example, for determining the weighting factor $w_j$.

[Math 7]

$$w_j = \left(1 - \frac{\Delta d_{j(xyz)}}{\Delta d_{(xyz)max}}\right) \quad (7)$$

In expression (7), $\Delta d_{(xyz)max}$ is the maximum of distance $\Delta d_{j(xyz)}$.

In this weight decision scheme, pixel pitch q, focal distance f, and baseline length B are included in interpolation parameters. Thus, according to expression (7), the weighting factor $w_j$ is 0 for an adjacent pixel j which is positioned at the distance of the maximum $\Delta d_{(xyz)max}$ and the weighting factor $w_j$ is the maximum for the reference pixel i. Thus, the weighting factor $w_j$ is determined so as to linearly decrease as the distance $\Delta d_{j(xyz)}$ in a three-dimensional space increases.

Next, determination of weighting factor $w_j$ for a certain depth block is illustrated by comparing uses of the second and fourth weight decision schemes.

Figure 8:
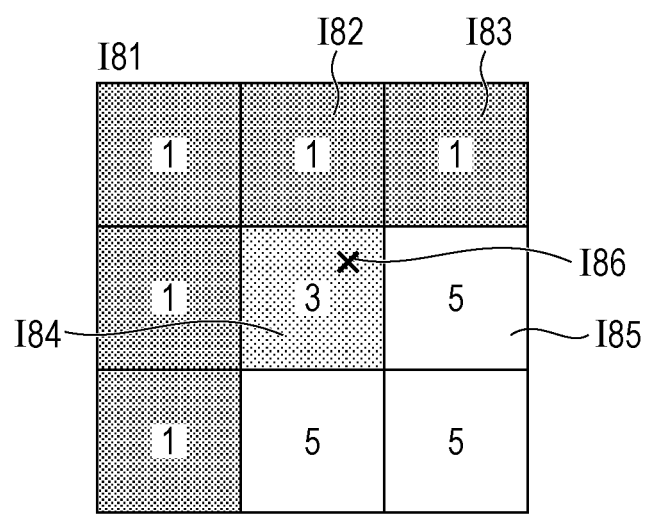
FIG. 8 shows an example of a depth block and an interpolation coordinate.

FIG. 8 shows an exemplary depth block and interpolation coordinates.

FIG. 8 represents a depth block I81. The depth block I81 contains nine pixels: three pixels in the horizontal direction and three pixels in the vertical direction. The pixel in the second column from the left in the topmost row represents an adjacent pixel I82. The pixel in the third column from the left in the topmost row represents an adjacent pixel I83. The pixel in the second column from the left in the second row from the top represents an adjacent pixel I84. The pixel in the third column from the left in the second row from the top represents an adjacent pixel I85. The symbol "×" indicated in the adjacent pixel I84 represents an interpolated pixel I86. The adjacent pixel I84 therefore is the reference pixel. The depth values of the adjacent pixels I82, I83, I84, and I85 are 1, 1, 3, and 5, respectively.

Difference absolute value $\Delta p_{j(z)}$, which is calculated when the second weight decision scheme is employed, for the adjacent pixels I82, I83, I84, and I85 is 2, 2, 0, and 2, respectively. Using expression (2), the weighting factor $w_j$ assumes the maximum for the adjacent pixel I84, which has the smallest difference absolute value $\Delta p_{j(z)}$. In contrast, the weighting factor $w_j$ is the same for adjacent pixels I82, I83, and I85, which have an equal difference absolute value $\Delta p_{j(z)}$.

By comparison, the fourth weight decision scheme converts depth value $p_{j(z)}$ to depth coordinates $Z_j$ using expression (4), for example. An example of the relation between a depth value and depth coordinates represented by expression (4) is shown here.

FIG. 9 conceptually shows an example of the relation between depth value $p_{j(z)}$ and depth coordinates $Z_j$.

As seen from FIG. 9, the depth value $p_{j(z)}$ monotonously decreases as the depth coordinates $Z_j$ increase. The rate at which the depth value $p_{j(z)}$ decreases also monotonously decreases as the depth coordinates $Z_j$ increase. For example, the distance $\Delta d_{j(z)}$ representing the difference in depth coordinates when the depth value decreases from 3 to 1 is greater than the distance $\Delta d_{j(z)}$ between depth coordinates for the depth values of 5 and 3.

Consequently, the adjacent pixel I85 has a shorter distance $\Delta d_{j(z)}$ between depth coordinates than adjacent pixels I82 and I83. A greater weighting factor $w_j$ is accordingly determined for the adjacent pixel I85, which has a shorter distance in the object space than adjacent pixels I82 and I83. As described, with the fourth weight decision scheme, the weighting factor $w_j$ for each adjacent pixel can be determined taking into account a distance in the object space.

Next, the process for the planar image interpolation unit 107 to calculate a signal value for an interpolation coordinate is described.

The planar image interpolation unit 107 adds the signal value $v_j$ of adjacent pixel j with weighting using the weighting factor $w_j$ input from the weight decision unit 105 to calculate the signal value $v_i$ for the interpolation coordinate i. The planar image interpolation unit 107 uses expression (8) for example, in weighted addition.

[Math 8]

$$v_i = \sum_j \frac{w_j \cdot v_j}{W} \quad (8)$$

In expression (8), the summation symbol $\Sigma_j$ represents summation over all adjacent pixels j for one interpolation coordinate i. W represents the total sum of weighting factors $w_j$ of all adjacent pixels j. Expression (8) accordingly means normalization of the weighting factor $w_j$ by use of W.

Generation of interpolated image signals according to this embodiment is described next.

FIG. 10 shows an exemplary interpolated image block I101.

FIG. 10 shows an interpolated image block I101. The one hundred squares (ten in the horizontal direction×ten in the vertical direction) contained in the interpolated image block I101 each represent the area occupied by an interpolated pixel. A figure such as 200 included in each square indicates the signal value corresponding to that pixel. The squares are indicated in a lighter color as they have a greater signal value. The display region of the interpolated image block I101 is the same as that of the image block I22 (see FIG. 6).

The interpolated image block I101 contains signal values for the individual interpolated pixels calculated with weighting factors $w_j$ determined by the second weight decision scheme described above. The signal values in the third to sixth columns from the left are 200, 200, 100, and 100, respectively. They are the same as signal values 200 and 100 in the same display region of the image block I22 (see FIG. 6).

As a comparison, generation of interpolated image signals with a traditional technique is illustrated.

FIG. 11 is an enlarged view showing another exemplary interpolated image block I111.

FIG. 11 shows an interpolated image block I111. Arrangement of the interpolated pixels contained in the interpolated image block I111 is the same as the arrangement of the interpolated pixels contained in the interpolated image block I101 (see FIG. 10). The display region of the interpolated image block I111 is also the same as that of the interpolated image block I101. The interpolated image block I111 contains signal values of individual interpolated pixels calculated using weighting factors $w_j$ determined by bi-linear interpolation as an example of traditional techniques.

The signal values in the third to sixth columns from the left are 200, 175, 125, and 100, respectively. These signal values vary more gently than the signal values 200, 200, 100, 100 in the same display region of the image block I101.

According to this embodiment, therefore, an edge at which signal values change sharply is maintained, avoiding the phenomenon of an edge becoming unclear, or a blur.

In the aforementioned bi-linear interpolation, the signal value $v_i$ of interpolation coordinate $P_{i(xy)}$ may be calculated using expression (9), for example.

[Math 9]

$$v_i = \frac{(2N-k)\cdot(2N-l)}{4N^2} v_{ix,iy} + \frac{(2N-k)\cdot l}{4N^2} v_{ix,iy+1} + \frac{k\cdot(2N-l)}{2N^2} v_{ix+1,iy} + \frac{k\cdot l}{2N^2} v_{ix+1,iy+1} \quad (9)$$

In expression (9), ($i_x$, $i_y$) is one of the center coordinates of four original pixels that is closest to the origin. Signal values $v_{ix, iy}$, $v_{ix, iy+1}$, $v_{ix+1, iy}$, and $v_{ix+1, iy+1}$ represent the signal values of the four original pixels (surrounding pixels) that neighbor the interpolation coordinate $P_{i(xy)}$. Note that expression (9) is an expression to be used when k and l are both positive values (see expression (1)).

Here, the denominator $(2N-k)\cdot(2N-l)$ of the weighting factor for the signal value $v_{ix, iy}$ is the product of the horizontal length 2N−k and the vertical length 2N−l from the interpolation coordinate $P_{i(xy)}$ to the center coordinates ($i_x$+1, $i_y$+1) on the opposite side of the center coordinates ($i_x$, $i_y$). Also for the other signal values, the weighting factor is a value proportional to the area defined by the horizontal and vertical lengths from the interpolated pixel i to the center coordinates on the opposite side of each center coordinates.

When either k or l is a negative value, a weighting factor defined on a similar principle can be used for weighted addition although a different set of surrounding pixels are used.

As described, in this embodiment, a signal value for an interpolation coordinate between pixels is determined by interpolating between signal values corresponding to adjacent pixels present within a predetermined range from the interpolation coordinate. In this embodiment, weighting factors are determined based on the depth value of the reference pixel closest to the interpolation coordinate and the depth values of adjacent pixels present within a predetermined range from the interpolated pixel, and the weighting factors determined are used to interpolate between the signal values of the adjacent pixels. This yields signal values that reflect variations in the distance to the subject in depth direction as interpolated pixels. This embodiment can particularly avoid the phenomenon of unclear edges and reduce degradation in the image quality of an interpolated image.

(Second Embodiment)

In the following, a second embodiment of the present invention will be described with reference to drawings.

Figure 12:
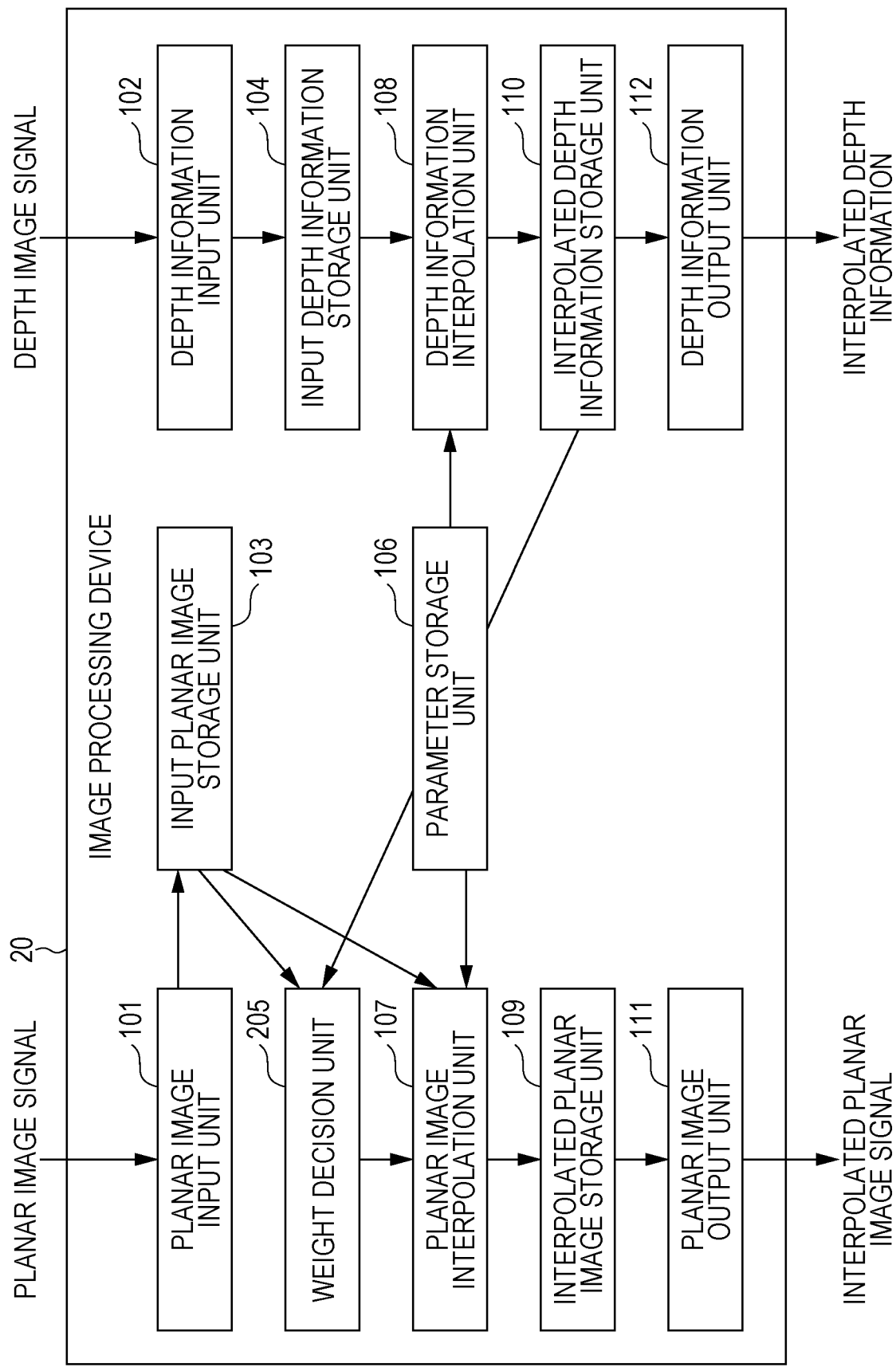
FIG. 12 schematically shows the configuration of an image processing device in a second embodiment of the invention.

FIG. 12 schematically illustrates the configuration of an image processing device 20 in the second embodiment.

The image processing device 20 includes a planar image input unit 101, a depth information input unit 102, an input planar image storage unit 103, an input depth information storage unit 104, a weight decision unit 205, a parameter storage unit 106, a planar image interpolation unit 107, a depth information interpolation unit 108, an interpolated planar image storage unit 109, an interpolated depth information storage unit 110, a planar image output unit 111, and a depth information output unit 112.

That is, the image processing device 20 has the weight decision unit 205 in place of the weight decision unit 105 (see FIG. 1). The other components of the image processing device 20 are similar to the image processing device 10 (see FIG. 1). The following description mainly focuses on differences from the image processing device 10.

The weight decision unit 205 reads a planar image signal from the input planar image storage unit 103 and depth information from the input depth information storage unit 104. The weight decision unit 105 reads interpolation parameters from the parameter storage unit 106. The weight decision unit 205 reads interpolated depth information from the interpolated depth information storage unit 110.

The weight decision unit 205 determines the weighting factor $w_j$ for each adjacent pixel based on the absolute value of the difference between the depth value corresponding to an interpolated pixel and the depth value corresponding to another interpolated pixel contained in the area occupied by an adjacent pixel.

The weight decision unit 205 sets the weighting factor $w_j$ to 1 for an adjacent pixel j that contains another interpolated pixel for which the absolute value of the difference from the depth value corresponding to the interpolated pixel in question is smaller than a predetermined value (e.g., 2), for example. The weight decision unit 205 sets weighting factor $w_j$ to 0 for an adjacent pixel j that contains no other interpolated pixel for which the absolute value of the difference from the depth value corresponding to the interpolated pixel in question is smaller than a predetermined value (e.g., 2).

This process will be described by taking a case where a depth block has been given as an example.

FIG. 13 shows another exemplary depth block I131.

FIG. 13 shows a depth block I131. The 25 squares (five in the horizontal direction×five in the vertical direction) contained in the depth block I131 each represent the area occupied by an original pixel. A figure such as 0 indicated in each square represents the depth value corresponding to that pixel. The squares are indicated in a lighter color as they have a greater depth value. The symbol "×" indicated in the pixel in the third column from the left in the third row from the top represents an interpolation coordinate I136.

FIG. 14 shows an exemplary interpolated depth block I141.

FIG. 14 shows an interpolated depth block I141. An interpolated depth block is information with interpolated depth values given to individual ones of the multiple interpolation coordinates contained in a partial region of a depth image. The one hundred squares (ten in the horizontal direction×ten in the vertical direction) contained in the interpolated depth block I141 represent the area occupied by interpolated pixels. A figure such as 0 indicated in each square represents the depth value corresponding to that interpolated pixel.

The interpolated depth block I141 is a part of interpolated depth information generated by the depth information interpolation unit 108 employing bi-linear interpolation and represents the same portion as the display region of the depth block I131.

The symbol "×" indicated in the interpolated pixel in the sixth column from the left in the sixth row from the top in the interpolated depth block I141 represents interpolated pixel I136 and is the center coordinates of that interpolated pixel.

FIG. 14 also represents an adjacent pixel I142 that occupies the area containing the four interpolated pixels in the fifth and sixth columns from the left in the fifth and sixth rows from the top in the interpolated depth block I141, an adjacent pixel I143 that occupies the area containing the four interpolated pixels in the seventh and eighth columns from the left in the fifth and sixth rows from top, an adjacent pixel I144 that occupies the area containing the four interpolated pixels in the fifth and sixth columns from the left in the seventh and eighth rows from the top, and an adjacent pixel I145 that occupies the area containing the four interpolated pixels in the seventh and eighth columns from the left in the seventh and eighth rows from the top.

The depth values of the four interpolated pixels contained in the adjacent pixel I142 are 0, 1, 1, and 4, respectively, including the depth value of 4 of the interpolated pixel in question. The depth values of the four interpolated pixels contained in the adjacent pixel I143 are 5, 8, 8, and 10, respectively, including the depth value of 5, for which the absolute value of difference from the depth value of 4 of the interpolated pixel in question is smaller than 2. The depth values of the four interpolated pixels contained in the adjacent pixel I144 are 5, 8, 8, and 10, respectively, including 5, for which the absolute value of difference from the depth value of 4 of the interpolated pixel in question is smaller than 2. The depth values of the four interpolated pixels contained in the adjacent pixel I145 are 9, 10, 10, and 10, respectively, including no depth value for which the absolute value of difference from the depth value of 4 of the interpolated pixel in question is smaller than 2.

The weight decision unit 205 accordingly determines the weighting factors $w_j$ for adjacent pixels I142, I143, and I144 as 1. The weight decision unit 205 determines the weighting factor $w_j$ for the adjacent pixel I145 as 0.

Figures 15, 16:
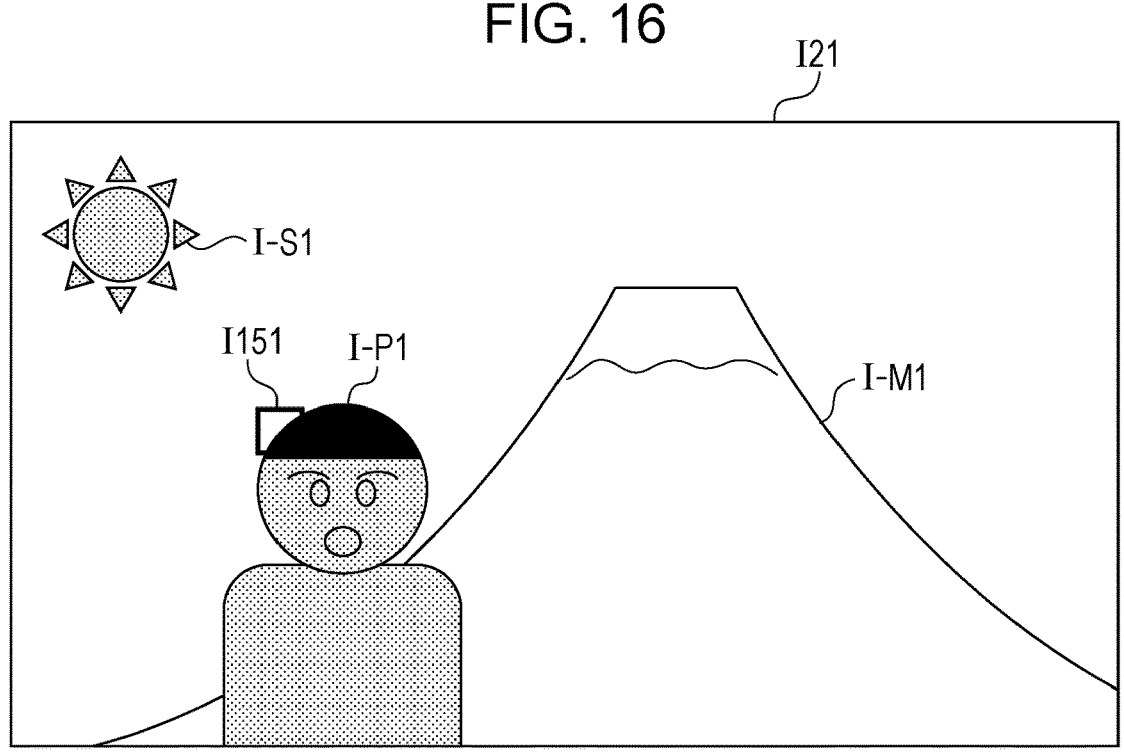
FIG. 15 shows another example of an image block.
FIG. 16 shows another example of a planar image.

FIG. 15 shows another exemplary image block I151.

FIG. 15 shows an image block I151. The image block I151 is an image block corresponding to the depth block I131.

The 25 squares (five in the horizontal direction×five in the vertical direction) contained in the image block I151 each represent the area occupied by an original pixel. A figure such as 100 included in each square indicates the signal value corresponding to that pixel. Pixels on the diagonal line from the upper right corner to the lower left corner of the image block I151 have a signal value of 50. Pixels positioned on the upper left side of the diagonal line have a signal value of 100. Pixels positioned on the lower right side of the diagonal line have a signal value of 0. Thus, the image block I151 has an edge portion oriented away from the horizontal or vertical direction.

The symbol "×" indicated in the pixel in the third column from the left in the third row from the top represents an interpolation coordinate I136.

The pixel that occupies the area containing the interpolation coordinate I136 is an adjacent pixel I142. The neighboring pixel on the right of the adjacent pixel I142 is an adjacent pixel I143. The neighoring pixel below the adjacent pixel I142 is an adjacent pixel I144. The neighboring pixel on the right of the adjacent pixel I144 is an adjacent pixel I145.

FIG. 16 shows another exemplary planar image I21.

FIG. 16 shows a planar image I21. An image block I151 represents an image corresponding to the portion occupied by the square indicated at the upper left of the head of the person I-PI shown in the planar image I21.

Generation of interpolated image signals according to this embodiment is now described.

FIG. 17 is an enlarged view of another exemplary interpolated image block I171.

FIG. 17 shows an interpolated image block I171. The one hundred squares (ten in horizontal direction×ten in vertical direction) contained in the interpolated image block I171 each represent the area occupied by an interpolated pixel. A figure such as 100 included in each square indicates the signal value corresponding to that pixel. The display region of the interpolated image block I171 is the same as that of the image block I151 (see FIG. 15).

The interpolated image block I171 contains signal values of the individual interpolated pixels calculated by the planar image interpolation unit 107 using weighting factors $w_j$ determined by the weight decision unit 205. For instance, the signal values in the fifth to tenth columns from the left in the third row from the top are 100, 87, 87, 66, 33, and 0, respectively.

By way of comparison, two examples of interpolated image signals generated with traditional techniques are shown.

FIG. 18 shows another exemplary interpolated image block I181.

FIG. 18 shows an interpolated image block I181. The arrangement of the interpolated pixels contained in the interpolated image block I181 is the same as the arrangement of the interpolated pixels contained in the interpolated image block I171 (see FIG. 17). The display region of the interpolated image block I181 is also the same as that of the interpolated image block I171. The interpolated image block I181 contains signal values of the individual interpolated pixels calculated using nearest neighbor interpolation as an example of traditional techniques.

For instance, the signal values in the fifth to tenth columns from the left in the third row from the top are 100, 100, 50, 50, 0, and 0, respectively.

These signal values are the same as signal values 100, 50, 0 in the same display region of the image block I151 of the original image, meaning that the edge will look like stair steps.

According to this embodiment, therefore, the phenomenon of an edge appearing like stair steps, or jaggies, is mitigated.

Figures 19, 20:
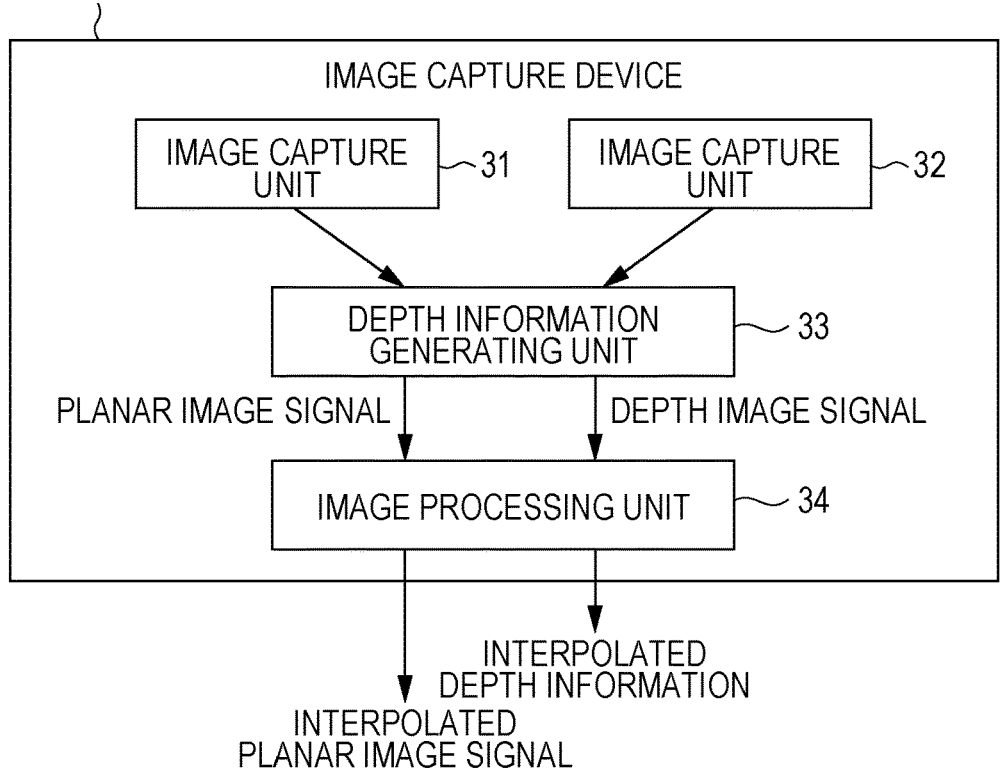
FIG. 19 shows another example of an interpolated image block.
FIG. 20 schematically shows the configuration of an image capture device according to a third embodiment of the invention.

FIG. 19 shows another exemplary interpolated image block I191.

FIG. 19 shows an interpolated image block I191. The arrangement of the interpolated pixels contained in the interpolated image block I191 is the same as that of interpolated pixels contained in the interpolated image block I171 (see FIG. 17). The display region of the interpolated image block I191 is also the same as that of the interpolated image block I171. The interpolated image block I191 contains the signal values of individual interpolated pixels calculated using bi-linear interpolation as an example of traditional techniques.

For example, the signal values in the fifth to tenth columns from the left in the third row from the top are 100, 90, 71, 50, 25, and 9, respectively.

These signal values vary more gradually than the signal values in the same display region of the interpolated image block I171.

According to this embodiment, therefore, the phenomenon of signal values at an edge varying gradually, or a blur, is mitigated.

The weight decision unit 205 may use depth values corresponding to interpolated pixels instead of the depth value $p_{i(z)}$ corresponding to the reference pixel i in the second or fourth weight decision scheme described above. In the second and fourth weight decision schemes, an error equivalent to half the pixel pitch can occur in coordinates on a plane corresponding to a depth value. Such errors can be reduced by use of depth values corresponding to interpolated pixels. This can achieve improvement of image quality by taking advantage of high resolution.

As described, in this embodiment, weighting factors are determined based on the depth value at each one of interpolation coordinates contained in adjacent pixels present within a predefined range from an interpolated pixel, and the weighting factors are used to interpolate between the signal values of adjacent pixels. This increases the accuracy of signal values for the depth-direction distance to the subject. This embodiment in particular mitigates the phenomenon of an edge oriented away from the horizontal or vertical direction appearing like stair steps (jaggies) and/or the phenomenon of an edge becoming gradual (a blur). This can reduce degradation in the image quality of an interpolated image.

(Third Embodiment)

A third embodiment of the invention will be now described with reference to drawings.

FIG. 20 schematically illustrates the configuration of an image capture device 30 in this embodiment.

The image capture device 30 includes two image capture units 31, 32, a depth information generating unit 33, and an image processing unit 34.

The image capture units 31, 32 are disposed at different positions (viewpoints) and capture images of a subject included in the same field of view at predefined frame time intervals. The image capture units 31, 32 may be a stereo camera integrating the two, for example. Image signals indicative of images captured by the image capture units 31, 32 are composed of signal values for individual pixels arranged on a two-dimensional plane. The image capture units 31, 32 separately output image signals indicative of captured images to the depth information generating unit 33 on a per-frame basis.

The depth information generating unit 33 specifies the image signal input from either one of the image capture units 31 and 32, for example, the image capture unit 31, as a reference image signal (a planar image signal).

The depth information generating unit 33 calculates for each pixel a disparity between the image represented by the planar image signal and the image represented by the image signal input from the other image capture unit 32, and generates depth information that includes the disparity value calculated as a depth value. The depth information generating unit 33 may employ block matching, for example, for disparity value calculation.

The depth information generating unit 33 outputs the planar image signal and the depth information generated to the image processing unit 34.

The image processing unit 34 generates an interpolated planar image signal and interpolated depth information based on the planar image signal and depth information input from the depth information generating unit 33. The image processing unit 34 has a similar configuration to the image processing device 10 (see FIG. 1) or the image processing device 20 (see FIG. 12). The image processing unit 34 outputs the interpolated planar image signal and interpolated depth information generated to outside the image capture device 30.

Thus, in this embodiment, interpolated planar image signals of higher resolution than image signals captured by the image capture units 31, 32 can be obtained, reducing degradation in the image quality of the image represented by such an interpolated planar image signal.

(Fourth Embodiment)

A fourth embodiment of the present invention is now described with reference to drawings.

Figure 21:
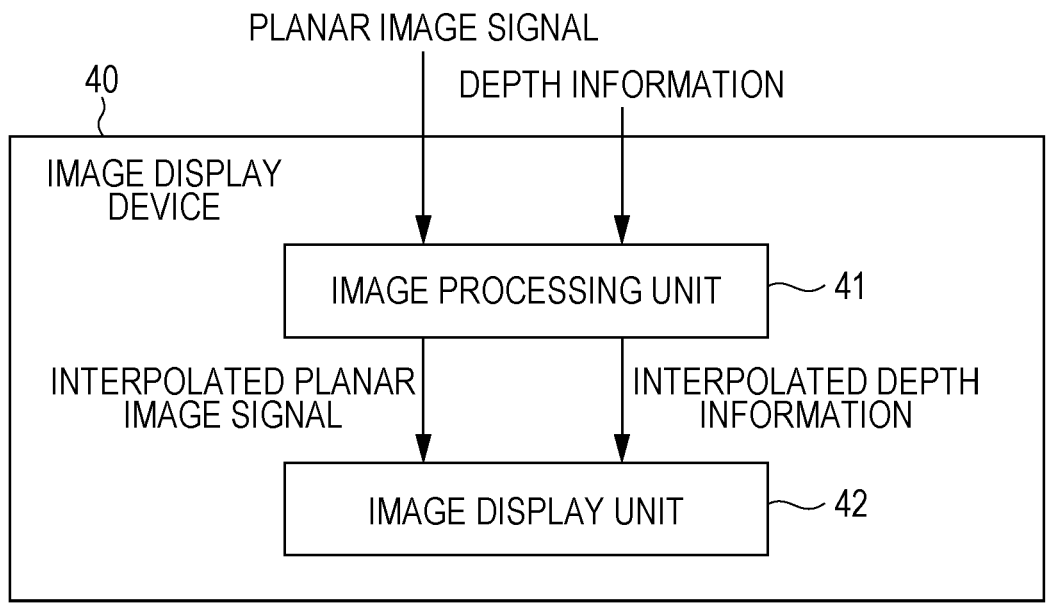
FIG. 21 schematically shows the configuration of an image display device according to a fourth embodiment of the invention.

FIG. 21 schematically shows the configuration of an image display device 40 in this embodiment.

The image display device 40 includes an image processing unit 41 and an image display unit 42.

To the image processing unit 41, planar image signals and depth information are input from outside the image display device 40. In a case where a planar image signal for a left image, a planar image signal for a right image, and depth information corresponding to them are input to the image processing unit 41, the image processing unit 41 generates both left and right interpolated planar image signals and interpolated depth information based on the left and right planar image signals and depth information. If a planar image signal and depth information are input to the image processing unit 41, the image processing unit 41 specifies the input planar image signal as the left image signal and generates an interpolated planar image signal and interpolated depth information for the left image. Then, based on the interpolated planar image signal and interpolated depth information generated for the left image, a right image signal is generated. Here, the image processing unit 41 generates an interpolated planar image signal for the right image by positioning the signal value of each one of the pixels contained in the left-image interpolated planar image signal at a pixel positioned apart by the amount of disparity indicated by the depth value of the corresponding pixel included in the interpolated depth information.

The image processing unit 41 has a similar configuration to the image processing device 10 (see FIG. 1) or the image processing device 20 (see FIG. 12).

The image display unit 42 displays a stereo image represented by the interpolated planar image signal and interpolated depth information input from the image processing unit 41.

The image display unit 42 may be a two-view 3D display (a stereo display) or a projector (stereo projector) that displays a left image to be presented to the viewer's left eye and a right image to be presented to the right eye, for example.

The image display unit 42 may be a projector that displays the image represented by the left image signal and the image represented by the right display image signal alternately on a screen at half the frame time interval (e.g., 1/60 seconds), for example. The viewer sees a stereo image using stereoscopic glasses having a shutter (e.g., a liquid crystal shutter) capable of controlling the passage and blocking of light beams to the viewer's left and right eyes in synchronization with the time interval.

The image display unit 42 may also be a projector that displays the image represented by the left image signal and the image represented by the right image signal with different polarization characteristics on a screen. The viewer sees a stereo image by wearing stereoscopic glasses having a polarizing filter corresponding to the polarization characteristics for the left image signal on the left eye lens and a polarizing filter corresponding to the polarization characteristics for the right image signal on the right eye lens.

Alternatively, the image display unit 42 may be a parallax barrier display including a display surface which displays an alternate arrangement of image bands, having a vertically long shape, for the image represented by the left image signal and image bands for the image represented by the right image signal, and slits that vertically extend in front of the display surface. The image display unit 42 may also be a lenticular display with such a display surface and convex lenses (lenticular lenses) extending in the vertical direction in front of the display surface.

Figure 22:
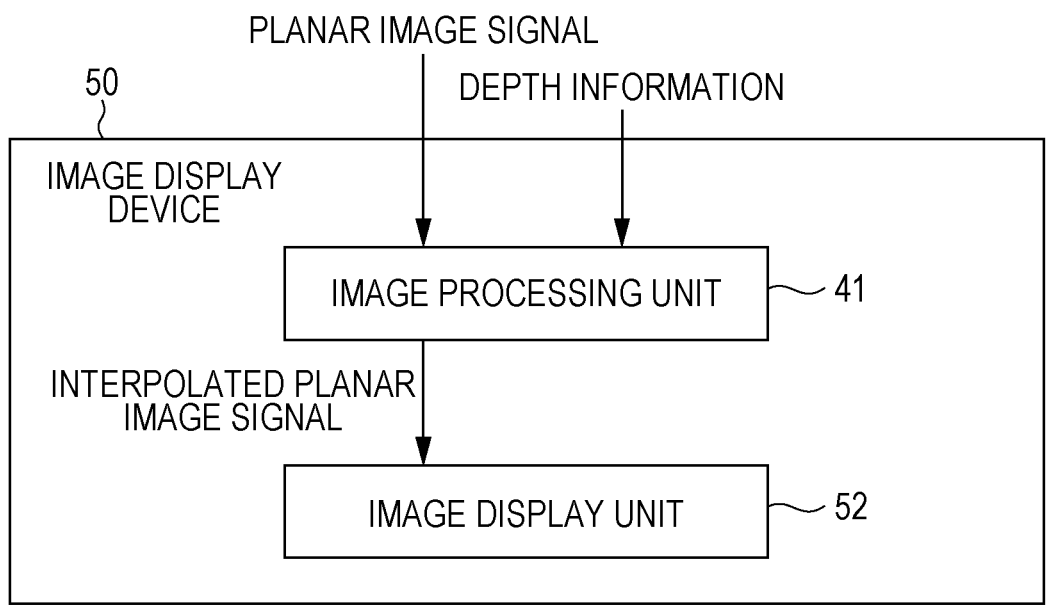
FIG. 22 schematically shows the configuration of an image display device according to a variation of the fourth embodiment of the invention.

The image display device in this embodiment is not limited to a stereo image display, such as the image display device 40 described above, but may be a 2D image display device, for example. FIG. 22 schematically shows the configuration of an image display device 50 according to a variation of the fourth embodiment of the invention. The image display device 50 has an image display unit 52, instead of the image display unit 42 of the image display device 40. The image display unit 52 displays a planar image represented by an interpolated planar image signal input from the image processing unit 41.

In this embodiment, therefore, an interpolated planar image signal of higher resolution than the input planar image signal, such as an interpolated planar image signal adapted to the resolution of the image display unit, may be obtained. This embodiment can reduce degradation in the image quality of the image represented by such an interpolated planar image signal.

Although the interpolation factor was described as being 2 in the above embodiments, this embodiment is not limited thereto. In this embodiment, the interpolation factor may be greater than one, e.g., 3.

The above embodiments were described by illustrating a case where the planar image interpolation unit 107 calculates the total sum W of weighting factors $w_j$ input from the weight decision unit 105, 205 and divides a weighted sum of signal values $v_j$ by the calculated total sum W, thereby normalizing the weighting factor $w_j$. This embodiment is not limited thereto, however. In this embodiment, the weight decision unit 105, 205 may determine a weighting factor $w_j$ normalized so as to make the total sum W one, and the planar image interpolation unit 107 may use the normalized weighting factor $w_j$ to add signal value $v_j$ with weighting. In this case, the planar image interpolation unit 107 may omit the process of division by the total sum W.

Although the image capture device 30 was described above by illustrating a case where a two-view stereo image is captured by means of two image capture units disposed at two viewpoints, this embodiment is not limited thereto. In this embodiment, a multi-view stereo image employing more viewpoints than two may be captured, as long as an image signal for one viewpoint and depth information showing the relation between that viewpoint and the other viewpoints can be generated from a multi-view image signal captured.

Although the image capture device 30 was described above by illustrating a case where interpolated planar image signals and interpolated depth information are output to outside, this embodiment is not limited thereto. In this embodiment, the image capture device 30 may include a storage for storing interpolated planar image signals and interpolated depth information that have been generated such that they are associated with each other. In this embodiment, the image capture device 30 may also include a display unit for displaying a stereo image represented by an interpolated planar image signal and interpolated depth information generated.

Although the image display device 40 was described above as displaying a two-view stereo image as an example, this embodiment is not limited thereto. In this embodiment, a multi-view stereo image employing more viewpoints than two may be displayed. A multi-view image signal can be generated by using an image signal for at least one viewpoint and depth information showing the relation between that viewpoint and the other viewpoint(s).

The image display device 40 described above may additionally include a storage for storing generated interpolated planar image signals and interpolated depth information in association with each other.

Part of the image processing device 10, 20, the image capture device 30, and the image display device 40 of the above described embodiments, e.g., the weight decision unit 105, 205, planar image interpolation unit 107, depth information interpolation unit 108, depth information generating unit 33, and/or image processing unit 34, 41, may be implemented by a computer. In this case, these components may be implemented by recording programs for realizing their control functions in a computer-readable recording medium, from which the programs are read and executed by a computer system. The term "computer system" as used herein refers to a computer system incorporated in the image processing device 10, 20, image capture device 30, or image display device 40 and is intended to encompass OSs and hardware such as peripheral devices. The term "computer-readable recording media" refers to storage devices including portable media such as a flexible disk, magneto-optical disk, ROM, and CD-ROM, a hard disk contained in a computer system, and the like. The term "computer-readable recording media" may also include media that store programs temporarily or dynamically, like a transmission line used when a program is transmitted over a network such as the Internet or a communications line such as a telephone line, as well as media for storing a program for a certain time period, such as volatile memory provided in a computer system serving as a server or a client in such a scenario. Such programs may also realize part of the aforementioned functions or realize the aforementioned functions in conjunction with programs prestored in a computer system.

In addition, part or all of the image processing device 10, 20, image capture device 30, and image display device 40 in the above-described embodiments may be realized in an integrated circuit, such as large scale integration (LSI). The functional blocks of the image processing device 10, 20, image capture device 30, and image display device 40 may be either implemented as separate processors, or some or all of them may be integrated into a single processor. The technique for integrated circuitry is not limited to LSI but a dedicated circuit or a general purpose processor may be employed. If a new integrated circuit technique to replace LSI emerges with advances in the semiconductor technology, an integrated circuit produced by such a technique could be employed.

While embodiments of the present invention have been described in detail with reference to drawings, the specific configuration is not limited to the above-described ones, but various modifications of design or the like can be made within the scope and spirit of the invention.

REFERENCE SIGNS LIST 10, 20 image processing device
101 planar image input unit
102 depth information input unit
103 input planar image storage unit
104 input depth information storage unit
105, 205 weight decision unit
106 parameter storage unit
107 planar image interpolation unit
108 depth information interpolation unit
109 interpolated planar image storage unit
110 interpolated depth information storage unit
111 planar image output unit
112 depth information output unit
30 image capture device
31, 32 image capture unit
33 depth information generating unit
34 image processing unit
40, 50 image display device
41 image processing unit
42, 52 image display unit

The invention claimed is:

1. An image processing device comprising:
image input circuitry that inputs a planar image signal containing signal values of pixels arranged on a plane and depth information including depth values corresponding to the pixels; and
interpolation circuitry that generates an enlarged image by calculating a signal value for an interpolation pixel on the plane of a planar image, wherein
the interpolation pixel is calculated by interpolating a signal value of a reference pixel and signal values of adjacent pixels,
the reference pixel includes the interpolation pixel,
the adjacent pixels are present within a predetermined distance from the interpolation pixel,
the interpolation circuitry calculates the signal value for the interpolation pixel based on a difference between a depth value of the reference pixel and a depth value of one of the adjacent pixels,
a resolution corresponding to the reference pixel is the same as a resolution corresponding to the adjacent pixels,
the resolution corresponding to the reference pixel is different from a resolution corresponding to the interpolation pixel,
the interpolation circuitry calculates the signal value for the interpolation pixel based on distances between a three-dimensional position of the reference pixel and three-dimensional positions of the adjacent pixels,
the adjacent pixels are determined such that the reference pixel is within the predetermined distance from the interpolation pixel,
the interpolation circuitry:
calculates the distances between the three-dimensional position of the reference pixel and the three-dimensional positions of the adjacent pixels;

determines a weighting factor for each of the adjacent pixels based on the distance between the adjacent pixel and the reference pixel and on a maximum one of the distances;

calculates the signal value for the interpolation pixel based on a sum of results obtained by multiplying the signal value of each of the adjacent pixels by the weighting factor of that adjacent pixel, and the interpolation circuitry determines the weighting factor identified as $w_j$ using expression (1), where $\Delta d_{j(xyz)}$ is a distance between the three-dimensional position of the reference pixel i and the three-dimensional position of the adjacent pixel identified as j, and $\Delta d_{(xyz)max}$ is a maximum of distance $\Delta d_{j(xyz)}$ $$w_j = \left(1 - \frac{\Delta d_{j(xyz)}}{\Delta d_{(xyz)max}}\right). \qquad (1)$$

* * * * *